(12) United States Patent
Okamoto et al.

(10) Patent No.: US 6,915,295 B2
(45) Date of Patent: Jul. 5, 2005

(54) INFORMATION SEARCHING METHOD OF PROFILE INFORMATION, PROGRAM, RECORDING MEDIUM, AND APPARATUS

(75) Inventors: Seishi Okamoto, Kawasaki (JP); Hiroya Inakoshi, Kawasaki (JP); Akira Sato, Kawasaki (JP); Takahisa Ando, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 496 days.

(21) Appl. No.: 10/102,773

(22) Filed: Mar. 22, 2002

(65) Prior Publication Data

US 2003/0115193 A1 Jun. 19, 2003

(30) Foreign Application Priority Data

Dec. 13, 2001 (JP) .......................................... 2001-379851

(51) Int. Cl.[7] .............................................. G06F 17/30
(52) U.S. Cl. .................... 707/3; 707/4; 707/5; 707/6; 707/10
(58) Field of Search ................. 707/3, 4, 5, 6, 707/10, 1, 104; 705/8, 10; 345/810; 434/322

(56) References Cited

U.S. PATENT DOCUMENTS

| | | | | |
|---|---|---|---|---|
| 5,754,939 A | * | 5/1998 | Herz et al. .................. 455/3.04 |
| 6,289,340 B1 | * | 9/2001 | Puram et al. ................... 707/5 |
| 6,385,620 B1 | * | 5/2002 | Kurzius et al. ........... 707/104.1 |
| 6,460,036 B1 | * | 10/2002 | Herz ............................ 707/10 |
| 6,681,223 B1 | * | 1/2004 | Sundaresan ..................... 707/6 |
| 6,728,706 B2 | * | 4/2004 | Aggarwal et al. .............. 707/5 |
| 2002/0046074 A1 | * | 4/2002 | Barton .......................... 705/8 |
| 2002/0091669 A1 | * | 7/2002 | Puram et al. .................. 707/1 |
| 2002/0091690 A1 | * | 7/2002 | Bailey et al. .................. 707/6 |
| 2002/0103793 A1 | * | 8/2002 | Koller et al. .................. 707/3 |
| 2002/0116379 A1 | * | 8/2002 | Lee et al. ...................... 707/5 |
| 2002/0138481 A1 | * | 9/2002 | Aggarwal et al. ............. 707/6 |
| 2002/0169652 A1 | * | 11/2002 | Busche ........................ 705/10 |
| 2003/0008270 A1 | * | 1/2003 | Fleishman .................. 434/322 |
| 2003/0009479 A1 | * | 1/2003 | Phair ....................... 707/104.1 |
| 2003/0036350 A1 | * | 2/2003 | Jonsson et al. ............... 455/41 |
| 2003/0117444 A1 | * | 6/2003 | Puram et al. ............... 345/810 |

FOREIGN PATENT DOCUMENTS

| JP | 2000148864 A | 5/2000 |
|---|---|---|
| JP | 20001184545 A | 7/2001 |

* cited by examiner

*Primary Examiner*—Thuy N. Pardo
(74) *Attorney, Agent, or Firm*—Staas & Halsey LLP

(57) ABSTRACT

In a candidate data searching step, a plurality of similar candidate data is searched from a profile data group having a peculiar attribute value every different attribute on the basis of an input in which one or a plurality of attribute values have been designated. In a significance calculating step, significance regarding the attribute is calculated on the basis of the searched candidate data and non-candidate data. In a score calculating step, a score of each candidate data is calculated on the basis of the calculated significance. In a search result outputting step, each candidate data is ranked on the basis of the calculated score, and the ranked upper candidate data is outputted as a search result.

48 Claims, 14 Drawing Sheets

| EMPLOYEE No. | : 010001 |
| --- | --- |
| YEAR OF ENTERING COMPANY | : 2001 |
| SEX | : MALE |
| BELONGING | : SYSTEM DEVELOPMENT DIVISION |
| BUSINESS | : PROGRAMMING |
| QUALIFICATION | : ENGLISH EXAMINATION THE FIRST CLASS |
| LANGUAGE | : Java |

ATTRIBUTES        ATTRIBUTE VALUES

| | |
|---|---|
| SEX | : MALE |
| BUSINESS | : PROGRAMMING |
| QUALIFICATION | : ENGLISH EXAMINATION THE FIRST CLASS |

| | |
|---|---|
| EMPLOYEE No. | : 990100 |
| SEX | : MALE |
| BELONGING | : BUSINESS SUPPORTING DIVISION |
| BUSINESS | : PROGRAMMING |
| QUALIFICATION | : ENGLISH EXAMINATION THE SECOND CLASS |
| LANGUAGE | : Java |

| | |
|---|---|
| EMPLOYEE No. | : 000026 |
| SEX | : FEMALE |
| BUSINESS | : PROGRAMMING |
| QUALIFICATION | : ENGLISH EXAMINATION THE THIRD CLASS |
| LANGUAGE | : COBOL |

| | |
|---|---|
| SEX | : MALE |
| BUSINESS | : PROGRAMMING |
| QUALIFICATION | : ENGLISH EXAMINATION THE FIRST CLASS |

[VIEWPOINT : LANGUAGE = Java]

| | |
|---|---|
| EMPLOYEE No. | : 990111 |
| SEX | : MALE |
| BELONGING | : BUSINESS SUPPORTING DIVISION |
| BUSINESS | : PROGRAMMING |
| QUALIFICATION | : ENGLISH EXAMINATION THE FIRST CLASS |
| LANGUAGE | : Java |

[VIEWPOINT : LANGUAGE = C++]

EMPLOYEE No.  : 970120

SEX           : MALE

BELONGING     : FINANCIAL SYSTEM DIVISION

BUSINESS      : PROGRAMMING

QUALIFICATION : ENGLISH EXAMINATION
                THE FIRST CLASS

LANGUAGE      : C++

[VIEWPOINT : LANGUAGE = COBOL]

EMPLOYEE No.  : 003010

SEX           : MALE

BELONGING     : ACCOUNTING DIVISION

BUSINESS      : ACCOUNTING

QUALIFICATION : ENGLISH EXAMINATION
                THE FIRST CLASS

LANGUAGE      : COBOL

SEX            : MALE
BUSINESS       : PROGRAMMING
QUALIFICATION  : ENGLISH EXAMINATION
                 THE FIRST CLASS
```

EMPLOYEE No.   : 970120
SEX            : MALE  (0.1)
BELONGING      : FINANCIAL SYSTEM DIVISION
BUSINESS       : PROGRAMMING  (0.6)
QUALIFICATION  : ENGLISH EXAMINATION
                 THE FIRST CLASS  (0.9)
LANGUAGE       : C++
                                    66-3  66-2
```

| | |
|---|---|
| OCCUPATION | : COMPUTER MAKER |
| INTERESTED MUSIC GENRE | : ROCK |
| INTERESTED BOOK GENRE | : DETECTIVE STORY |
| ISBN-xxx | : ? |

No.1:SCORE = 1.0 :   ISBN-xxx = BUY

No.2:SCORE = 0.8 :   ISBN-xxx = BUY

No.3:SCORE = 0.5 :   ISBN-xxx = NOT BUY

No.4:SCORE = 0.4 :   ISBN-xxx = NOT BUY

No.5:SCORE = 0.3 :   ISBN-xxx = NOT BUY

FIG. 11C 76     78-1

| | | |
|---|---|---|
| ISBN-xxx | : BUY | (60%) |
| ISBN-xxx | : NOT BUY | (40%) |

78-2

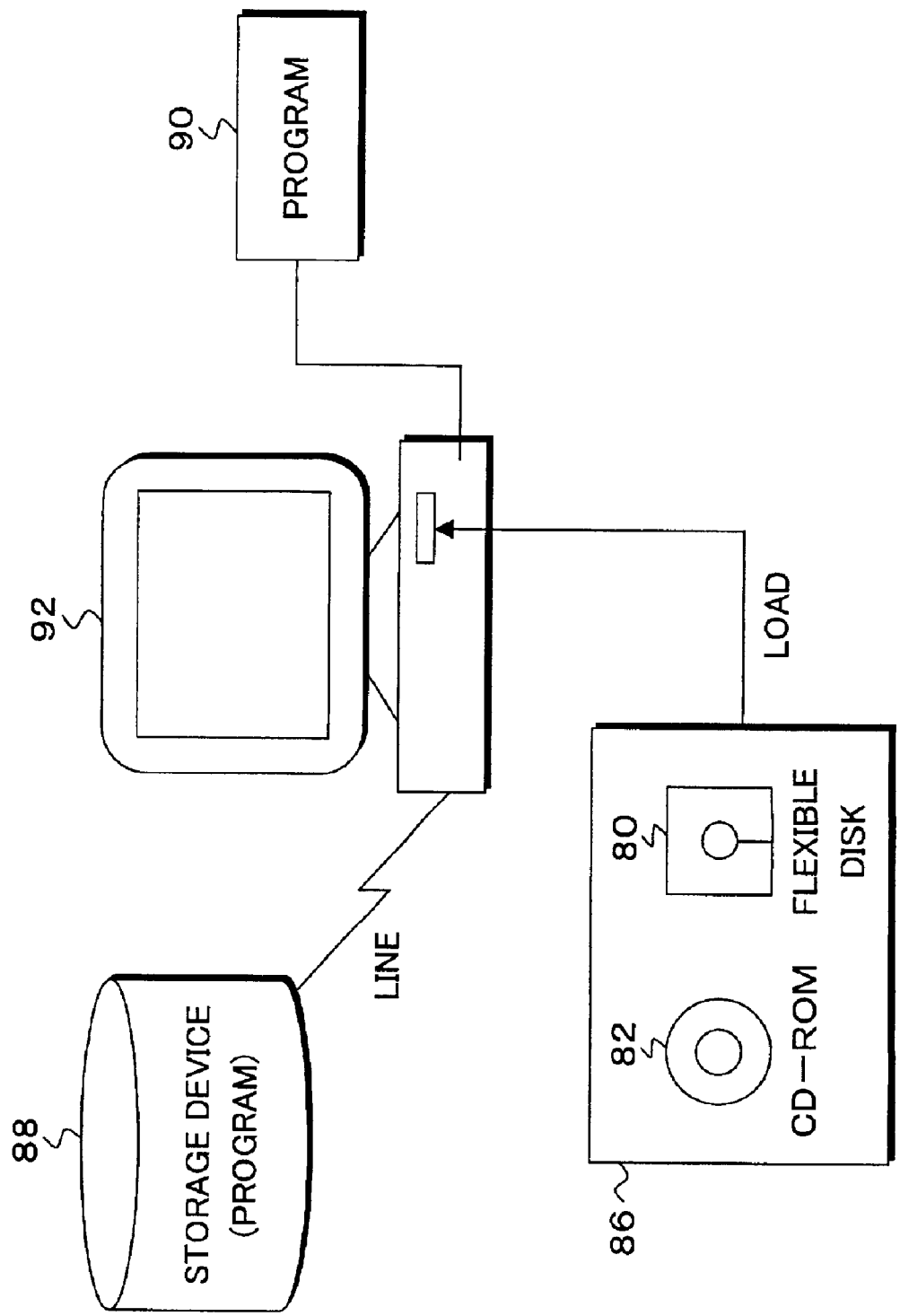

INFORMATION SEARCHING METHOD OF PROFILE INFORMATION, PROGRAM, RECORDING MEDIUM, AND APPARATUS

BACKGROUND OF THE INVENTION

1. Field of the Invention

The invention relates to an information searching method of profile information, a program, a recording medium, and an apparatus which are used for searching profile data indicative of features such as user, contents, services, and the like and presuming an unknown attribute value by using attribute values. More particularly, the invention relates to an information searching method of profile information, a program, a recording medium, and an apparatus which are used for searching valid profile data and presuming an unknown attribute value on the basis of significance of an attribute designated as a search input.

2. Description of the Related Arts

In recent years, it has become important to execute information processes such as search in which attention is paid to features of each user, each contents, and each service, presumption of an unknown attribute value, and the like by holding features such as user, contents, services, and the like as profile data and effectively using those profile data. For example, in case of starting up a certain project in a company, a technique such that information such as posts, belonging, skills, and the like of employees is held as profile data and the employee suitable for each charge of the project can be searched by using the profile data is becoming important. In the field of electronic commerce, a technique such that user profile data showing features of a customer is held and whether the customer is a superior customer or an inferior customer is presumed by using the user profile data is becoming important. As mentioned above, information processes such as search, presumption, and the like using various profile data are becoming important. A technique such that it is possible to perform search and presumption effectively using the features such as each user, each contents, and each service, is demanded.

According to the conventional information searching technique, for example, as disclosed in JP-A-2001-148864, a method whereby similar users are preliminarily clustered on the basis of profile data and search and presumption are performed on the basis of features of the users belonging to the same cluster is used. According to such a technique, the cluster to which the user is assumed to belong is selected from the clusters which have previously been created, and the users belonging to such a cluster are presented, so that the users similar to such a user can be searched. An unknown attribute value can be presumed from distribution of values in the cluster to which the user is assumed to belong.

In the conventional information search regarding the profile data as a target, however, since it is necessary to previously create the clusters before the profile data is searched or the unknown attribute value is presumed, if the profile data changes, a problem such that it is impossible to cope with a change in information until the clusters are newly created occurs. Although the user profile data belongs to one of the clusters which have previously been created, if there is a difference between the features of the user profile data and the cluster, a problem such that precision of the search for the user profile data or the presumption of the unknown attribute value deteriorates occurs. Further, since the search for the users by the user profile data can be executed only from a uniform viewpoint, there is a possibility that an operation of high costs such that a desired result is searched from many search results is forced on a searcher.

SUMMARY OF THE INVENTION

According to the invention, there are provided an information searching method of profile information, a program, a recording medium, and an apparatus, in which it is possible to promptly cope with a change in profile data, features of each user, each contents, each service, and the like are accurately grasped, and valid search and presumption of an unknown attribute value of high precision can be performed.

The invention also provides an information searching method of profile information regarding profile data as a target. The profile data used here denotes file information having a peculiar attribute value every different attribute and holds an attribute indicative of each feature and its attribute value every target such as user, contents, services, or the like.

According to the first embodiment of the invention, there is provided an information searching method comprising:

a candidate data searching step wherein on the basis of input data in which one or a plurality of attribute values have been designated, a plurality of similar candidate data is searched from a profile data group having a peculiar attribute value every different attribute;

a significance calculating step wherein significance regarding the attribute is calculated on the basis of the searched candidate data and non-candidate data;

a score calculating step wherein a score of each candidate data is calculated on the basis of the calculated significance; and a search result outputting step wherein each candidate data is ranked on the basis of the calculated score and the ranked upper candidate data is outputted as a search result.

According to the information searching method of the invention as mentioned above, in the candidate data searching step, a coarse search is executed to the input attribute value, and the whole profile data is classified mainly into the candidate data having similarity and the other non-candidate data. Subsequently, in the significance calculating step, the candidate data is set to a positive example (candidate data), the non-candidate data is set to a negative example, and the significance of the positive example in which the larger a degree of difference from the negative example is, the larger the significance is calculated every attribute. In the score calculating step, the score of the attribute value of each candidate data is calculated by using a weight according to the significance. In the search result outputting step, finally, the candidate data having the high score is used as a search result. Therefore, since the significance is calculated on the basis of the profile data held at present, it is possible to promptly cope with a change in profile data and the valid search result can be obtained at high precision with respect to the attribute value designated by the search input.

In the candidate data searching step, the score is obtained with respect to each profile data and the candidate data is searched. In correspondence to it, in the score calculating step, the score obtained in the candidate data searching step is added to the score calculated on the basis of the significance, thereby calculating the score of each candidate data. In the significance calculating step, the significance of every different attribute is calculated on the basis of the candidate data and the non-candidate data. In the significance calculating step, for example, an information gain is calculated as significance of every different attribute. In this case, in the score calculating step, the similarity is calculated as a score of each candidate data by using the information gain as a weight. In the significance calculating step, the significance of the different attribute values included in the same attribute is calculated. In the significance calculating step, for example, an MVDM (Modified Value Difference Metric) is calculated as significance of the different attribute values. In this case, in the score calculating step, the similarity is calculated as a score of each candidate data by using the MVDM (Modified Value Difference Metric) as a weight.

Although the invention is fundamentally made on the assumption that the significance of the candidate data is calculated, there is a case where the significance larger than that of the candidate data is calculated among the non-candidate data excluded by the coarse search in dependence on the attribute. Therefore, in the score calculating step, further, the score of the non-candidate data is calculated on the basis of the calculated significance. In the search result outputting step, each of the candidate data and the non-candidate data is ranked on the basis of the calculated score, and the ranked upper candidate data is outputted as a search result. If there is a surplus in burden of a cost calculation, it is also possible to calculate costs with respect to the non-candidate data and determine the profile data to be outputted.

In the search result outputting step, a predetermined number of ranked upper candidate data or the candidate data having a score that is equal to or larger than a predetermined threshold value is outputted as a search result. In the search result outputting step, the calculated significance is added to the attribute value of the profile data to be outputted as a search result, and the resultant value is outputted. Therefore, the user can easily understand the search result by seeing the significance added to the search result and can properly make a decision about whether the search result is valid or not. In the search result outputting step, if an output per viewpoint has been designated, the attributes having the large significance among the calculated significance are automatically selected as viewpoints. Each candidate data is classified every different attribute value included in the attributes of the selected viewpoints. Each candidate data which was classified every attribute value is ranked on the basis of the calculated score. The ranked upper candidate data is outputted as a search result per viewpoint. For example, the attribute having the largest significance among the significance calculated as mentioned above is automatically selected as a viewpoint and outputted in accordance with the classification of the candidate data and the ranking by the costs. Therefore, for example, in the case where the attribute such as a computer language has the maximum significance and is automatically selected as a viewpoint, the user can obtain the search result per viewpoint which has been classified and ranked every attribute value such as Java, C++, or COBOL, so that he can efficiently obtain the desired search result in a short time.

The invention provides an information searching method of the second embodiment which enables an uninput profile attribute value to be presumed. This information searching method comprises:

a candidate data searching step wherein on the basis of input data in which one or a plurality of attribute values including an uninput attribute value have been designated, a plurality of similar candidate data is searched from a profile data group including the attribute values having a peculiar value every different attribute;

a significance calculating step wherein significance regarding the attribute is calculated on the basis of the searched candidate data and non-candidate data;

a score calculating step wherein a score of each candidate data is calculated on the basis of the calculated significance; and a presumption result outputting step wherein similar data to the input attribute value is determined from the candidate data in accordance with the score of each candidate data, and the uninput attribute value of the input data is presumed on the basis of distribution of the uninput attribute values in the similar data and outputted.

The candidate data searching step, significance calculating step, and score calculating step are fundamentally the same as those in the information searching method of the first embodiment. In the presumption result outputting step, reliability calculated on the basis of the score of each candidate data is added to the presumed uninput attribute value and the resultant uninput attribute value is outputted. The reliability is equal to a value obtained by, for example, dividing the score which enables the presumption value of each candidate data by the total score.

The invention provides a program of the first embodiment for searching profile data. This program allows a computer to execute:

a candidate data searching step wherein on the basis of input data in which one or a plurality of attribute values have been designated, a plurality of similar candidate data is searched from a profile data group having a peculiar attribute value every different attribute;

a significance calculating step wherein significance regarding the attribute is calculated on the basis of the searched candidate data and non-candidate data;

a score calculating step wherein a score of each candidate data is calculated on the basis of the calculated significance; and a search result outputting step wherein each candidate data is ranked on the basis of the calculated score and the ranked upper candidate data is outputted as a search result.

The invention provides a program for a searching method of the second embodiment for presuming an uninput profile attribute value. This program allows a computer to execute:

a candidate data searching step wherein on the basis of input data in which one or a plurality of attribute values including an uninput attribute value has been designated, a plurality of similar candidate data is searched from a profile data group including the attribute values having a peculiar attribute value every different attribute;

a significance calculating step wherein significance regarding the attribute is calculated on the basis of the searched candidate data and non-candidate data;

a score calculating step wherein a score of each candidate data is calculated on the basis of the calculated significance; and a presumption result outputting step wherein similar data to the input attribute value is determined from the candidate data in accordance with the score of each candidate data and the uninput attribute value of the input data is presumed on the basis of distribution of the uninput attribute values in the similar data and outputted.

The candidate data searching step, significance calculating step, and score calculating step are fundamentally the same as those in the information searching method of the first embodiment. In the presumption result outputting step, reliability calculated on the basis of the score of each candidate data is added to the presumed uninput attribute value and the resultant uninput attribute value is outputted. The reliability is equal to a value obtained by, for example, dividing the score which enables the presumption value of each candidate data by the total score.

The invention provides a computer-readable recording medium of the first embodiment in which a program for searching profile data has been stored. The program in the recording medium allows a computer to execute:

a candidate data searching step wherein on the basis of input data in which one or a plurality of attribute values including an uninput attribute value have been designated, a plurality of similar candidate data is searched from a profile data group having a peculiar attribute value every different attribute;

a significance calculating step wherein significance regarding the attribute is calculated on the basis of the searched candidate data and non-candidate data;

a score calculating step wherein a score of each candidate data is calculated on the basis of the calculated significance; and a search result outputting step wherein each candidate data is ranked on the basis of the calculated score and the ranked upper candidate data is outputted as a search result.

The invention provides a computer-readable recording medium of the second embodiment in which a program for presuming an unknown profile attribute value has been stored. The program in the recording medium allows a computer to execute:

a candidate data searching step wherein on the basis of input data in which one or a plurality of attribute values including an uninput attribute value has been designated, a plurality of similar candidate data is searched from a profile data group including the attribute values having a peculiar attribute value every different attribute;

a significance calculating step wherein significance regarding the attribute is calculated on the basis of the searched candidate data and non-candidate data;

a score calculating step wherein a score of each candidate data is calculated on the basis of the calculated significance; and a presumption result outputting step wherein similar data to the input attribute value is determined from the candidate data in accordance with the score of each candidate data, and the uninput attribute value of the input data is presumed on the basis of distribution of the uninput attribute values in the similar data and outputted.

The invention provides an information searching apparatus of the first embodiment for searching profile data. This information searching apparatus comprises:

a data storing unit in which a plurality of profile data each having a peculiar attribute value every different attribute has been stored;

a candidate data searching unit which searches a plurality of similar candidate data from the profile data group stored in the data storing unit on the basis of input data in which one or a plurality of attribute values have been designated;

a significance calculating unit which calculates significance regarding the attribute on the basis of the searched candidate data and non-candidate data;

a score calculating unit which calculates a score of each candidate data on the basis of the calculated significance; and a search result output unit which ranks each candidate data on the basis of the calculated score and outputs the ranked upper candidate data as a search result.

The invention provides an information searching apparatus of the second embodiment for presuming an unknown profile attribute value. This information searching apparatus comprises:

a data storing unit in which a plurality of profile data each including an attribute value having a peculiar attribute value every different attribute has been stored;

a candidate data searching unit which searches a plurality of similar candidate data from the profile data group stored in the data storing unit on the basis of input data in which one or a plurality of attribute values including an uninput attribute value have been designated;

a significance calculating unit which calculates significance regarding the attribute on the basis of the searched candidate data and non-candidate data;

a score calculating unit which calculates a score of each candidate data on the basis of the calculated significance; and a presumption result output unit which determines similar data to the input attribute value from the candidate data in accordance with the score of each candidate data, presumes the uninput attribute value of the input data on the basis of distribution of the uninput attribute values in the similar data, and outputs the presumed uninput attribute value.

The above and other objects, features, and advantages of the present invention will become more apparent from the following detailed description with reference to the drawings.

BRIEF DESCRIPTION OF THE DRAWINGS

FIG. 3 is an explanatory diagram of the profile data as a search target in the invention;

FIGS. 5A to 5C are explanatory diagrams of input data which is used in the search for candidate data and the profile data as a search target;

FIGS. 7A to 7D are explanatory diagrams of the input data and the profile data serving as an output per viewpoint;

FIGS. 8A and 8B are explanatory diagrams of the profile data which is outputted after significance is added thereto;

FIGS. 11A to 11C are explanatory diagrams of a presumption result to which input data of the attribute presuming process, similar profile data distribution, and reliability have been added; and FIG. 12 is an explanatory diagram of a recording medium in which a program according to the invention has been stored.

DETAILED DESCRIPTION OF THE PREFERRED EMBODIMENT

Figure 1:
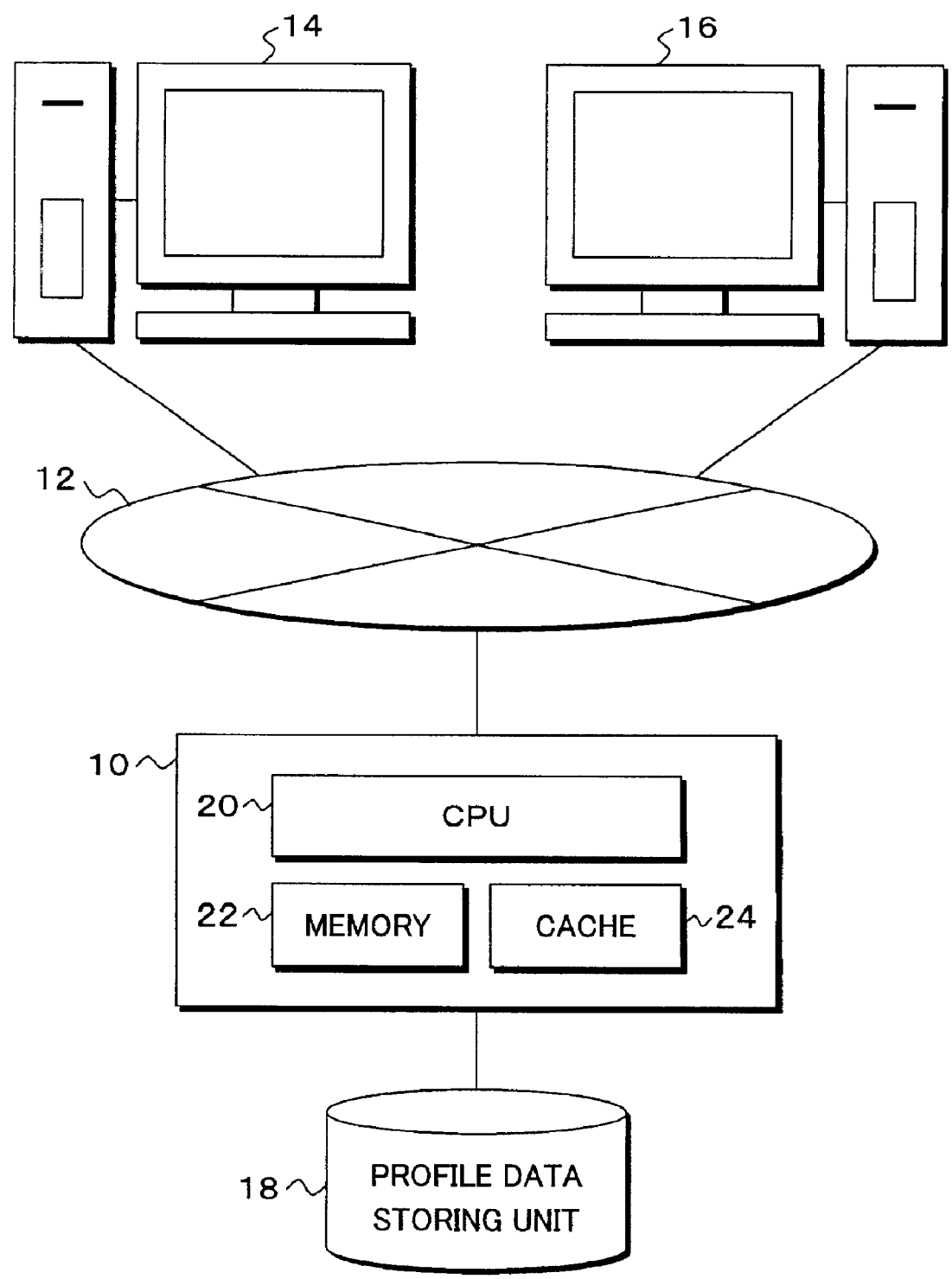
FIG. 1 is an explanatory diagram of an operation environment to which the invention is applied.

FIG. 1 is an explanatory diagram of an operation environment to which an information searching process of profile information according to the invention is applied. The information searching process of the invention is executed by a profile information processing server 10. A user apparatus 14 and an administrator apparatus 16 of a company are connected to the profile information processing server 10 via an Internet 12. The user apparatus 14 and administrator apparatus 16 issue a search request for the profile information regarding the user, contents, services, etc. and a request for presuming an unknown attribute value to the profile information processing server 10 via the Internet 12. A profile data storing unit 18 in which profile data showing features such as user, contents, services, etc. has been stored is connected to the profile information processing server 10. The profile information processing server 10 has a CPU 20, a memory 22, and a cache 24 as a hardware construction. A program for executing the information searching process of the invention is loaded into the memory 22. By executing this program by the CPU 20, search for the profile data and presumption of an unknown attribute value based on input data responsive to the search request are executed.

Figure 2:
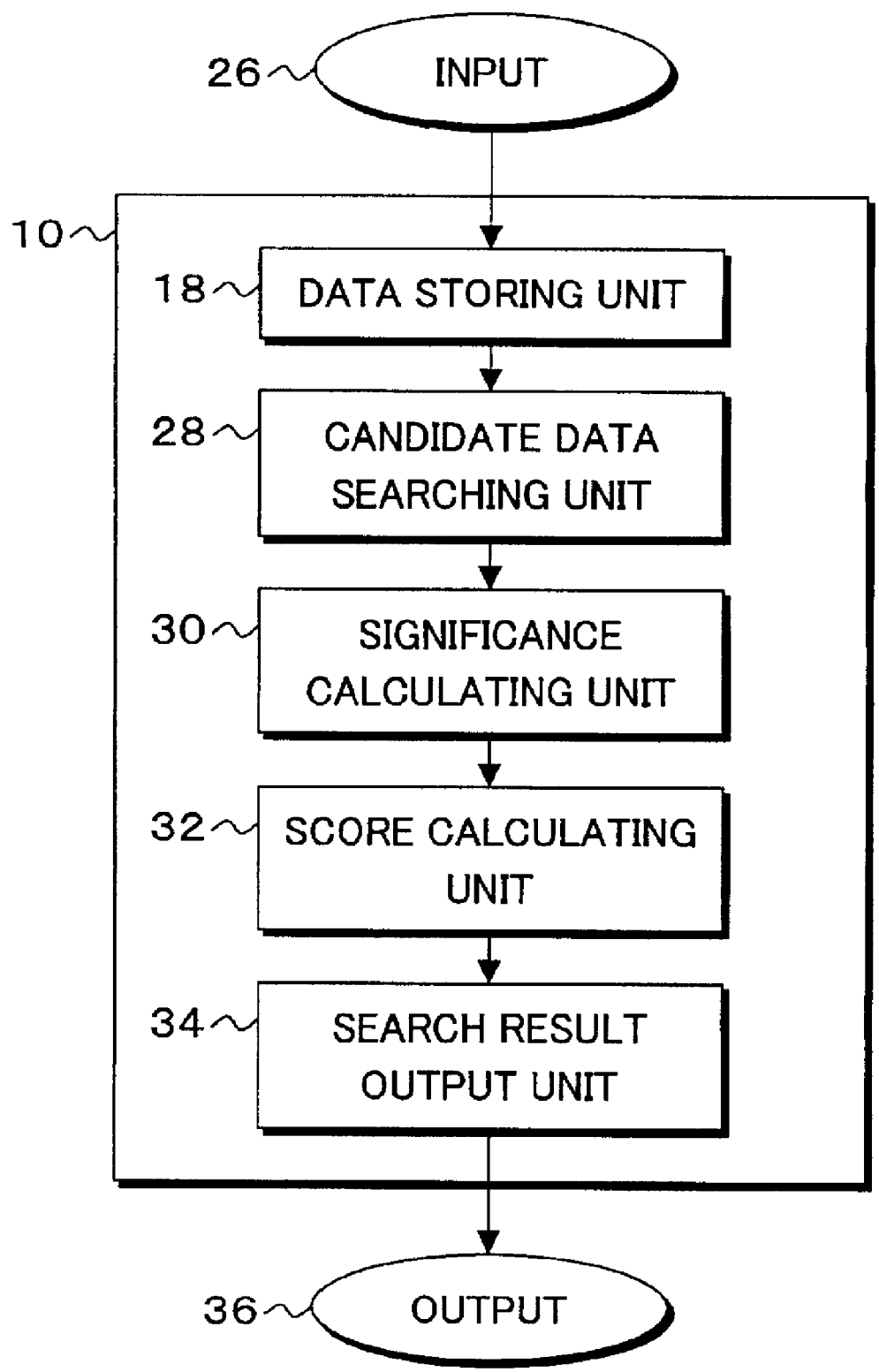
FIG. 2 is a block diagram of a functional construction of an information searching apparatus of the invention for searching profile data.

FIG. 2 is a block diagram of a functional construction of the profile information processing server 10 in FIG. 1 which operates as an information searching apparatus of the invention for searching the profile data. The profile data storing unit 18, a candidate data searching unit 28, a significance calculating unit 30, a score calculating unit 32, and a search result output unit 34 are provided for the profile information processing server 10. The profile data stored in the data storing unit 18 is data in which the features such as user, contents, services, etc. are expressed by attribute information.

FIG. 3 shows a specific example of the profile data stored in the data storing unit 18. Profile data 38 of an employee in a company is shown as an example. According to the profile data 38 of the employee, each of an employee number, an entering year at the company, sex, belonging, a business, a qualification, and a language is an attribute, and each of those different attributes has a peculiar attribute value.

Referring to FIG. 2 again, on the basis of a search data input 26 including one or a plurality of attribute values designated by the search request, the candidate data searching unit 28 searches a plurality of similar candidate data from a profile data group stored in the data storing unit 18. The profile data searched by the candidate data searching unit 28 is referred to as candidate data, while the profile data which is not searched is referred to as non-candidate data here. The significance calculating unit 30 calculates significance regarding the attribute on the basis of the candidate data searched by the candidate data searching unit 28 and the non-candidate data which is not searched. The significance regarding the attribute is calculated in a manner such that as the larger a change in information amount between the searched candidate data and the non-candidate data which is not searched is, the larger significance can be obtained. Besides the significance about each attribute, the significance calculating unit 30 can also calculate significance of the different attribute values in the same attribute. The score calculating unit 32 calculates a score of each candidate data on the basis of the significance calculated by the significance calculating unit 30. Upon calculation of the score of each candidate data, the score calculated by the candidate data searching unit 28 can be also added to the score calculated by the score calculating unit 32. That is, also in the search that is executed by the candidate data searching unit 28, similarity between the profile attribute value for search designated by the input data 26 and the profile attribute value of the profile data in the data storing unit 18 as a search target is calculated as a score, and the profile data having high scores is searched as candidate data. Therefore, the score can be also calculated by adding the score calculated at this time to the score calculated by the score calculating unit 32. The search result output unit 34 ranks each candidate data by sorting on the basis of the scores calculated by the score calculating unit 32, decides the ranked upper candidate data as a search result, and generates a search result output 36. The search result output unit 34 further executes a process for adding the significance calculated by the significance calculating unit 30 to the search result and outputting the added search result as an output of the search result per viewpoint or auxiliary information. The output of the search result per viewpoint is automatically selected by using the attribute having the large significance among the scores calculated by the score calculating unit 32 as a viewpoint, each candidate data is sorted every different attribute value included in the attribute of the selected viewpoint, each candidate data sorted every attribute value is ranked on the basis of the calculated score, and the upper candidate data is outputted as a search result per viewpoint.

The information searching process in FIG. 2 will now be described in detail with reference to flowcharts of FIGS. 4A and 4B. The flowcharts for the searching process of FIGS. 4A and 4B also realize a step of executing the program for the information searching process in the invention. In step S1, a profile attribute value is inputted as input data responsive to the search request from the user apparatus 14 or administrator apparatus 16 in FIG. 1. The attribute value as input data for the search request is data in which a specific attribute value necessary for search has been set with respect to each of the attributes of the sex, business, and a qualification, for example, like input data 52 in FIG. 5A. In next step S2, the candidate data is searched from the profile data group in the data storing unit 18 by using the known searching algorithm. The number of candidate data which is searched here can be set to the number of searches designated by the user who made the search request or can be also set to the number of data divided by a threshold value of the calculated score at the time of the search designated likewise by the user. Although an arbitrary algorithm can be used as a well-known search algorithm, for example, the search for the candidate data in step S2 can be performed by using a similarity function which is given by the following equation.

$$Sim(x, y) = \sum_{i=1}^{m} w_i \delta(x_i, y_i) \quad (1)$$

where,
m: the number of profile attributes
xi: value of an attribute i in x
yi: value of the attribute i in y
wi: weight of the attribute i
δ: if the attribute i is a discrete value attribute, 0 when xi=yi and 1 when xi≠yi; further, if a value of xi or yi is not designated, always 0;
(if the attribute i is a continuous value attribute, a value in which an absolute value of a difference between continuous values is normalized by 0 to 1)

The search for the candidate data using the similarity function will be specifically explained with respect to input data 52 responsive to a search request in FIG. 5A and user profile data 54 and 56 held in the data storing unit 18 in FIGS. 5B and 5C as examples as follows. With respect to the attribute i in the input data 52 in FIG. 5A, assuming that the sex is set to i=1, the business is set to i=2, and the qualification is set to i=3, the attribute values are set to x1=male, x2=programming, and x3=English proficiency examination: Level 1 (English examination: the first class), respectively. On the other hand, in case of the user profile data 54 as a search target in FIG. 5B, since it includes the same attributes of the sex, business, and qualification in correspondence to the attributes of the input data 52, their attribute values are set to y1=male, y2=programming, and y3=English proficiency examination: Level 2. All of the weights wi of the attribute i in the equation (1) are expressed by 1 without depending on the attribute i. It is assumed that, as a searching condition, the user has designated the score of 1 or less as a threshold value. By executing arithmetic operations of the similarity function of the equation (1) with respect to the user profile data 54 in FIG. 5B, δ is determined from the following relations with respect to the three kinds of attribute values.

x1=y1, δ=0 x2=y2, δ=0 x3=y3, δ=1

Therefore, a score as a similarity function which is given by the sum of δ of the three attribute values is equal to 1 in this case. If a value of a score Sim is equal to 1 as mentioned above, since it satisfies the condition designated by the user, that is, the condition in which the score is equal to or less than the threshold value 1, the user profile data 54 is searched as candidate data. Subsequently, a score as a similarity function is similarly obtained with respect to the user profile data 56 in FIG. 5C. δ for the attribute values x1 to x3 and y1 to y3 in this case is as follows.

x1=y1, δ=0 x2≠y2, δ=1 x3≠y3, δ=1

Therefore, the value of the score Sim which is given by the sum of δ of the three attribute values is equal to 2. Since the score as a threshold value is not equal to 1 or less, the user profile data 56 is not searched as candidate data.

Figure 6:
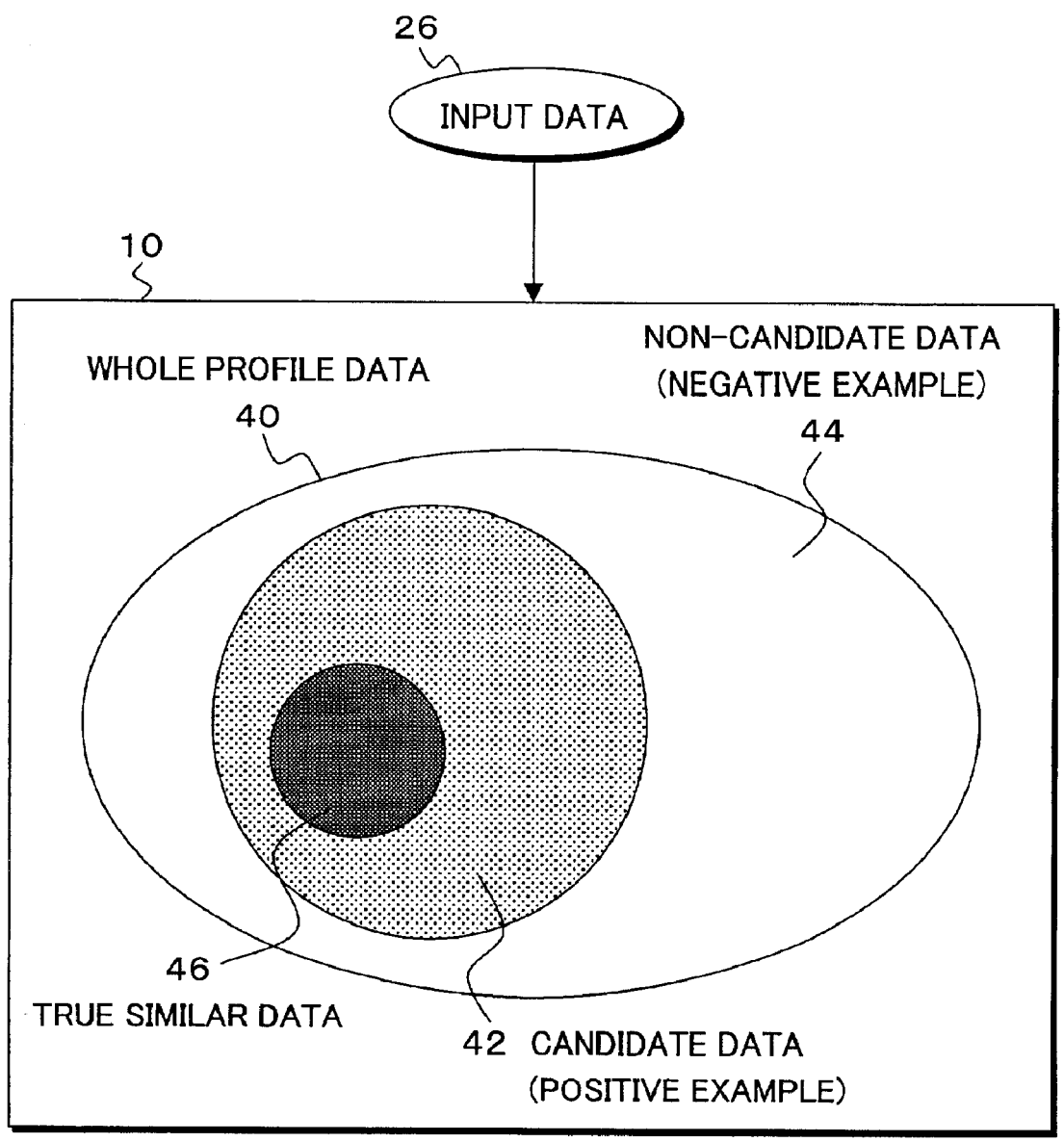
FIG. 6 is an explanatory diagram of a fundamental concept according to the searching process of the invention.

FIG. 6 shows a fundamental concept in the searching process of the invention. By the search in step S2 in FIG. 4A based on the input data 26 responsive to the search request by the user, in the profile information processing server 10, for example, by the execution of the well-known searching algorithm using the similarity function of the equation (1), candidate data 42 shown by a meshed region is searched from whole profile data 40. The remaining profile data other than the searched candidate data 42 becomes non-candidate data 44.

Subsequently, in step S3 in FIG. 4A, the significance regarding the attribute is calculated by using the candidate data searched in step S2. In the calculation of this significance, the significance regarding the attribute is not calculated by using all of the profile data stored in the data storing unit 18, that is, by using the whole profile data 40 like an explanation of the fundamental concept of FIG. 6 but the significance regarding the attribute is calculated by using the candidate data 42 as profile data which is similar to the profile attribute value of the input data 26 responsive to the search request and which has been searched in step S2. Therefore, the significance that is more adapted to the input data 26 as a profile attribute value for searching can be calculated. The significance of the attribute of the profile data in step S3 in FIG. 4A is calculated as an information gain IG of each attribute by regarding the candidate data 42 as profile data searched in step S2 as a positive example and by regarding the non-candidate data 44 which was not searched, as a negative example in FIG. 7. That is, significance IG(i) of a certain attribute i is calculated by the following equation.

$$IG(i) = -\frac{N_p}{N}\log_2\frac{N_p}{N} - \frac{N_n}{N}\log_2\frac{N_n}{N} - \sum_j \frac{N(i,v_j)}{N} \quad (2)$$

$$\left(-\frac{N_p(i,v_j)}{N(i,v_j)}\log_2\frac{N_p(i,v_j)}{N(i,v_j)} - \frac{N_p(i,v_j)}{N(i,v_j)}\log_2\frac{N_n(i,v_j)}{N(i,v_j)}\right)$$

where,

N: the total number of profile data

Np: the total number of positive examples

Nn: the total number of negative examples vj: possible value of the attribute i

N(i, vj): the total number of profile data in which the value of the attribute i is equal to vj Np(i, vj): the number of positive examples in which the value of the attribute i is equal to vj Nn(i, vj): the number of negative examples in which the value of the attribute i is equal to vj By using the information gain IG in the equation (2), the attribute in which a change in information amount in the candidate data 42 as a positive example and the non-candidate data 44 as a negative example in the fundamental concept in FIG. 6 is large can be calculated so as to have large significance. Here, upon decision of the significance of the attribute using the information gain IG in the equation (2), which one of the two different attributes is more important can be discriminated. However, the significance of the two different attribute values in the same attribute cannot be discriminated. For example, it is assumed that the attribute "business" has "programming", "system development", and "accounting" as attribute values. In this case, in the significance of the attribute using the information gain IG, either combination of the different attribute values, for example, "programming and system development" and "programming and accounting" is not matched but have the same score. However, the attribute value "programming" is presumed to be closer to the attribute value "system development" than to the attribute value "accounting". The significance of the different attribute values included in the same attribute can be discriminated by using values in the following equation called MVDM (Modified Value Difference Metric).

$$MVDM(v_1, v_2) = \left|\frac{v_{1p}}{V_1} - \frac{v_{2p}}{V_2}\right| + \left|\frac{v_{1n}}{V_1} - \frac{v_{2n}}{V_2}\right| \quad (3)$$

where, v1, v2: attribute value

Figure 4A:
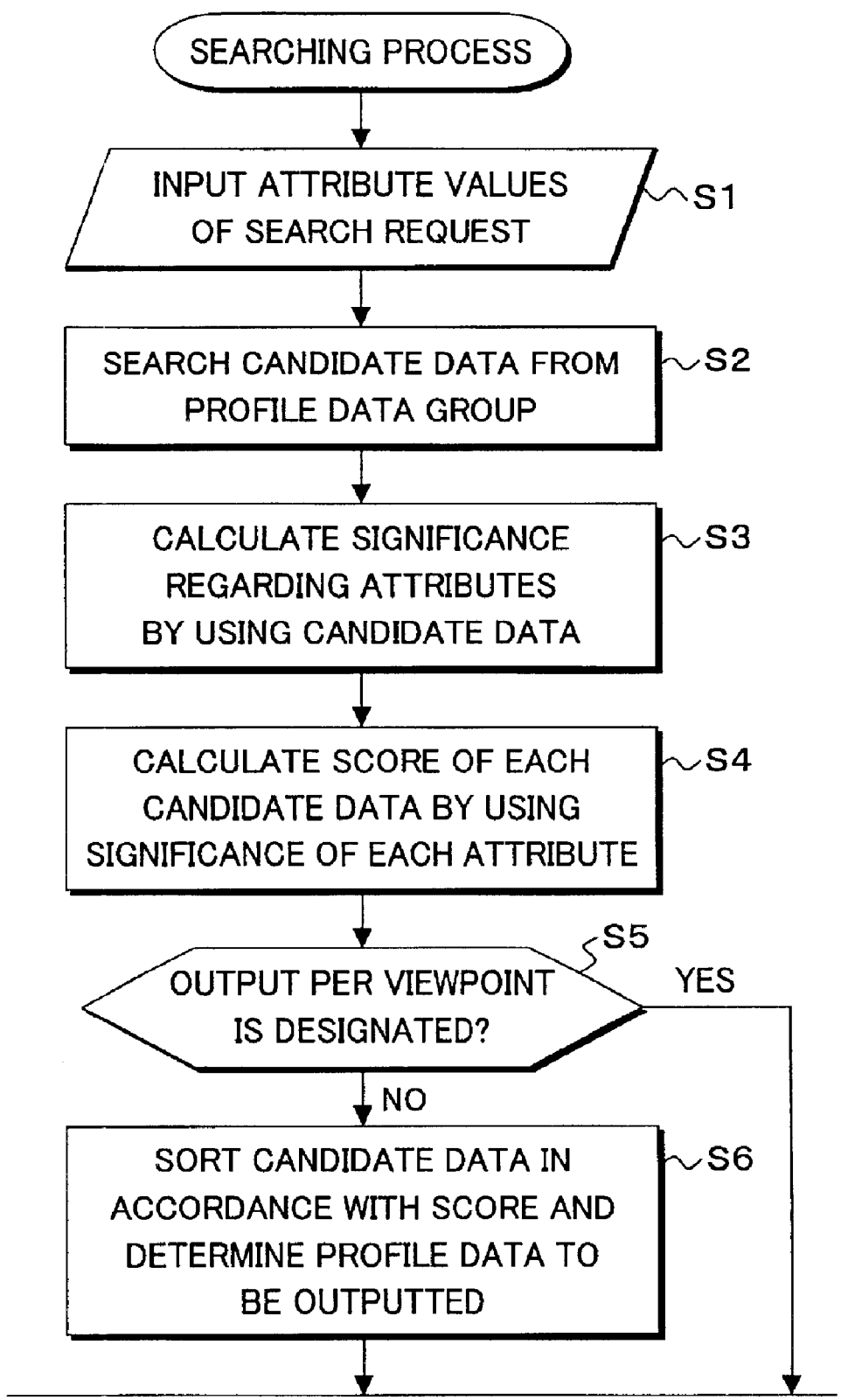
FIGS. 4A and 4B are flowcharts for a searching process in the invention according to the functional construction in FIG. 2.
Figure 4B:
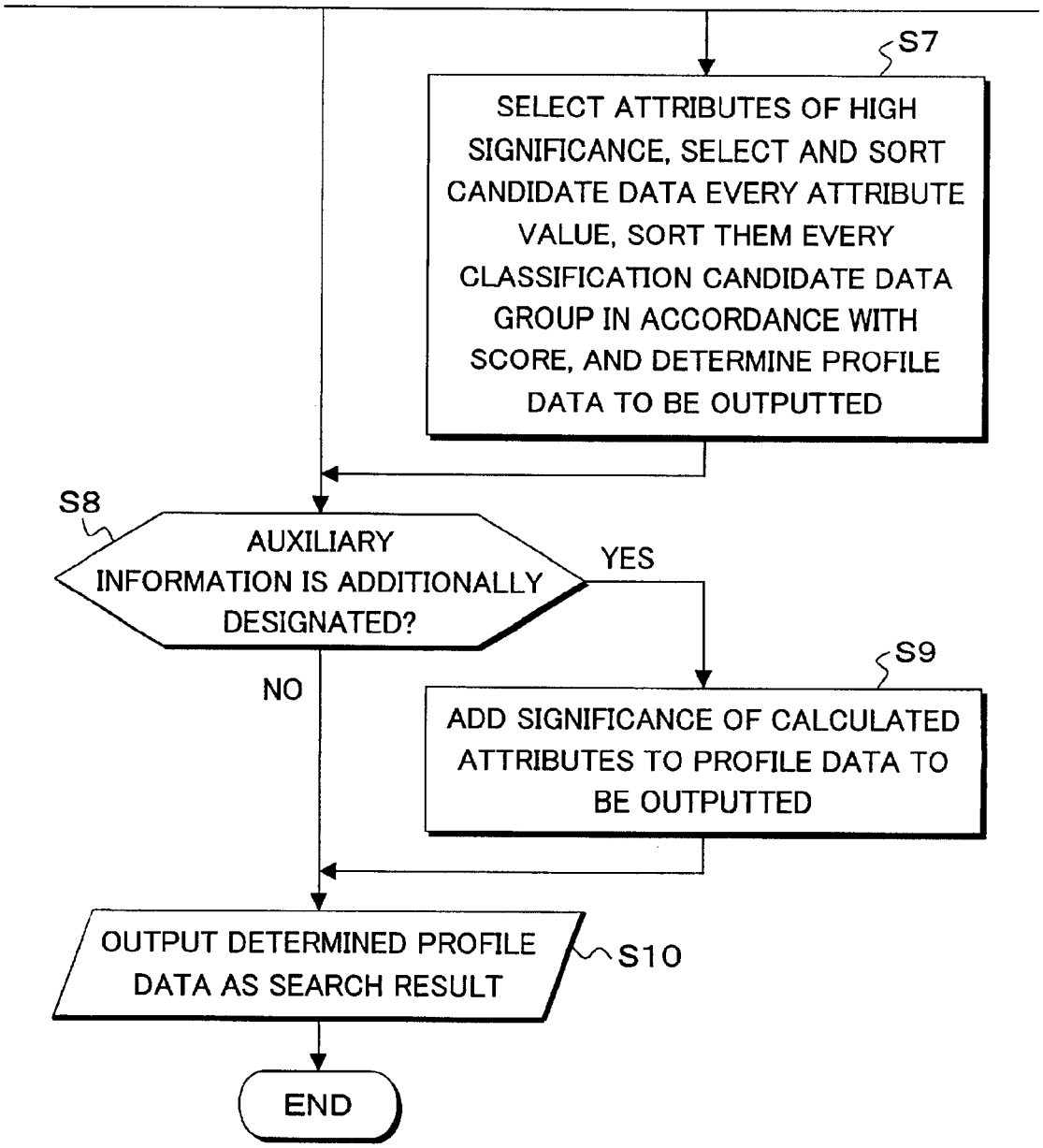

V1, V2: the number of profile data in which v1 and v2 appear, respectively v1p, v2p: the number of positive examples in which v1 and v2 appear, respectively v1n, v2n: the number of negative examples in which v1 and v2 appear, respectively Further, with regard to the attribute having the continuous value in step S3 in FIG. 4A, by making the continuous value discrete, the information gain IG in the equation (2) or the MVDM can be directly used.

Subsequently, in step S4 in FIG. 4A, the score of each candidate data searched in step S2 is calculated by using the significance regarding the attribute calculated in step S3. Upon calculation of this score, if the significance calculated in step S3 is the information gain IG, the similarity function is obtained by substituting the information gain IG(i) in the equation (2) for the weight wi in the equation (1), and this similarity function is set to the score of the candidate data.

On the other hand, if the significance calculated in step S3 is the MVDM, the next similarity function is set to the score.

$$Sim(x, y) = \sum_{i=1}^{m} MVDM(x_i, y_i) \quad (4)$$

Upon calculation of this score in step S4, the score obtained by adding the score calculated at the time of the search for the candidate data in step S2 to the score calculated with respect to each candidate data by using the significance can be also set to the score of each candidate data. Further, the profile data serving as a calculation target of the score in step S4 is only the candidate data 42 in the fundamental concept of FIG. 6 searched in step S2. Generally, since the number of candidate data which is searched in step S2 is smaller than the total number of profile data stored in the data storing unit 18, the burden of the score calculation in step S4 can be suppressed. On the other hand, in case of calculating the score using the significance calculated in step S3, there is a possibility that the score of the non-candidate data which was not searched in step S2 is better than that of the searched candidate data. Therefore, in the case where the user also wants to search the non-candidate data which was not searched in step S2 even if it takes a short surplus time to calculate the score, the score calculation in step S4 can be also executed with respect to the non-candidate data 44, that is, the whole profile data 40, in addition to the candidate data 42 in FIG. 6 as targets.

Subsequently, in step S5 in FIG. 4A, whether the search for the profile data per viewpoint has been designated or not is discriminated. The search for the profile data per viewpoint denotes that in the significance calculated in step S3, the candidate data is sorted every attribute value in the specific profile attribute having the large significance, and the search result of the profile data is outputted by using each attribute value as a viewpoint. If the output per viewpoint is not designated in step S5, step S6 follows. Each candidate data is sorted and ranked in accordance with the score calculated in step S4 and, for example, the designated number of upper candidate data is determined as output profile data. It is also possible to allow the user to designate the threshold value of the score in place of the designated number of upper candidate data and determine the candidate data of the scores which are equal to or larger than the designated threshold value as profile data which is outputted. If the output per viewpoint has been designated in step S5, step S7 follows. In step S7, the specific attribute having the large significance is selected from the significance of each attribute calculated in step S4, the candidate data is sorted every attribute value in the selected attribute, and the candidate data is sorted every sorted candidate data in accordance with the score calculated in step S4, thereby ranking the candidate data. The profile data to be outputted is determined per viewpoint every attribute value in accordance with the score of the designated number of upper candidate data or the designated threshold value. Owing to the realization of the search for the profile data per viewpoint as mentioned above, the user can easily understand the search result and the time that is required for the user to obtain the desired search result can be shortened.

FIGS. 7A to 7D are diagrams showing specific examples of the process for search output per viewpoint in step S7. It is now assumed that input data 58 having a profile attribute value in FIG. 7A is inputted, user profile data 60, 62, and 64 in FIGS. 7B to 7D is searched as candidate data in accordance with the input data 58, and with respect to the significance calculated in step S3, for example, the attribute "language" has the very large significance, it is selected as an attribute as a target of the viewpoint. The search results per viewpoint as shown in FIGS. 7B to 7D can be determined by using each of the attribute values "Java", "C++", and "COBOL" in the selected attribute "language" as a viewpoint. In the search results, although the user profile data 60 and 62 satisfies all conditions designated by the input data 58, if the user needs "Java" as a program language, it is possible to judge that the employee of the user profile data 60 satisfies the requirement.

On the other hand, if "C++" is necessary as a program language, it is possible to judge that a person who satisfies the requirement is the employee of the user profile data 62. Therefore, by the output of the search result per viewpoint, for the user, the burden which is applied when the user obtains the desired search result can be remarkably reduced.

In step S8 in FIG. 4B, subsequently, whether the user who made the search request has designated addition of the auxiliary information or not is discriminated. If the addition of the auxiliary information is not designated, step S10 follows and the search result is outputted as it is. If the addition of the auxiliary information has been designated, step S9 follows and the significance regarding the attribute calculated in step S3 is added as auxiliary information. After that, the profile data is outputted in step S10.

FIGS. 8A and 8B are diagrams showing examples of the significance which is added as auxiliary information in step S9. For example, if user profile data of FIG. 8B is determined as a search result in response to the input data 58 of FIG. 8A, since the user has designated the addition of the auxiliary information, significance 66-1, 66-2, and 66-3 such as "0.1", "0.6", and "0.9" calculated in step S3 is added to the attribute values of the sex, business, and qualification as attributes of the user profile data 62 which is outputted as a search result, respectively.

By adding the significance to each attribute of the profile data as a search result as mentioned above, the user can easily understand the search result by referring to the added significance.

Figure 9:
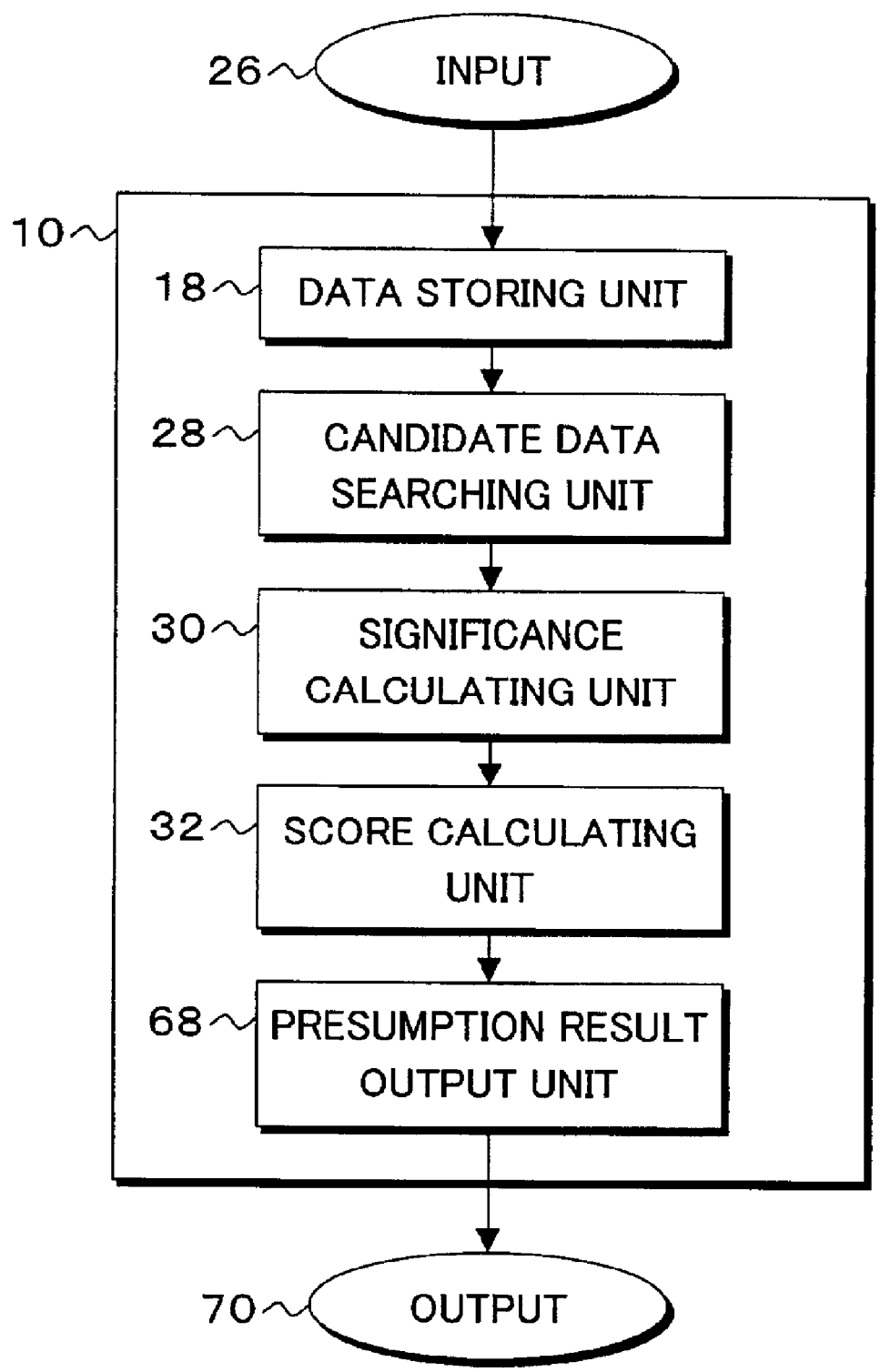
FIG. 9 is a block diagram of a functional construction of an information searching apparatus of the invention for presuming an unknown profile attribute value.

FIG. 9 is a block diagram of a functional construction of the profile information processing server 10 in FIG. 1 constructing the information searching apparatus of the invention for presuming an unknown profile attribute value. In the embodiment, the profile information processing server 10 comprises: the data storing unit 18; candidate data searching unit 28; significance calculating unit 30; score calculating unit 32; and a search result output unit 68. Among them, the data storing unit 18, candidate data searching unit 28, significance calculating unit 30, and score calculating unit 32 are fundamentally the same as those in the embodiment of FIG. 2. That is, the profile data as shown in FIG. 3 has been stored in the data storing unit 18. The candidate data searching unit 28 searches a plurality of similar candidate data from the profile data group in the data storing unit 18 on the basis of the input data 26 in which one or a plurality of profile attribute values including the uninput attribute value responsive to the search request have been designated. The significance calculating unit 30 calculates the significance regarding the attribute on the basis of the candidate data searched by the candidate data searching unit 28 and the non-candidate data which is not searched. The score calculating unit 32 calculates the score of each candidate data on the basis of the significance calculated by the significance calculating unit 30. The presumption result output unit 68 decides similar data to the input attribute value from the candidate data in accordance with the score of each candidate data calculated by the score calculating unit 32, presumes an attribute value regarding the uninput profile attribute in the input data on the basis of the distribution of the unknown attribute values in the similar profile data, and outputs the presumed attribute value.

Figure 10:
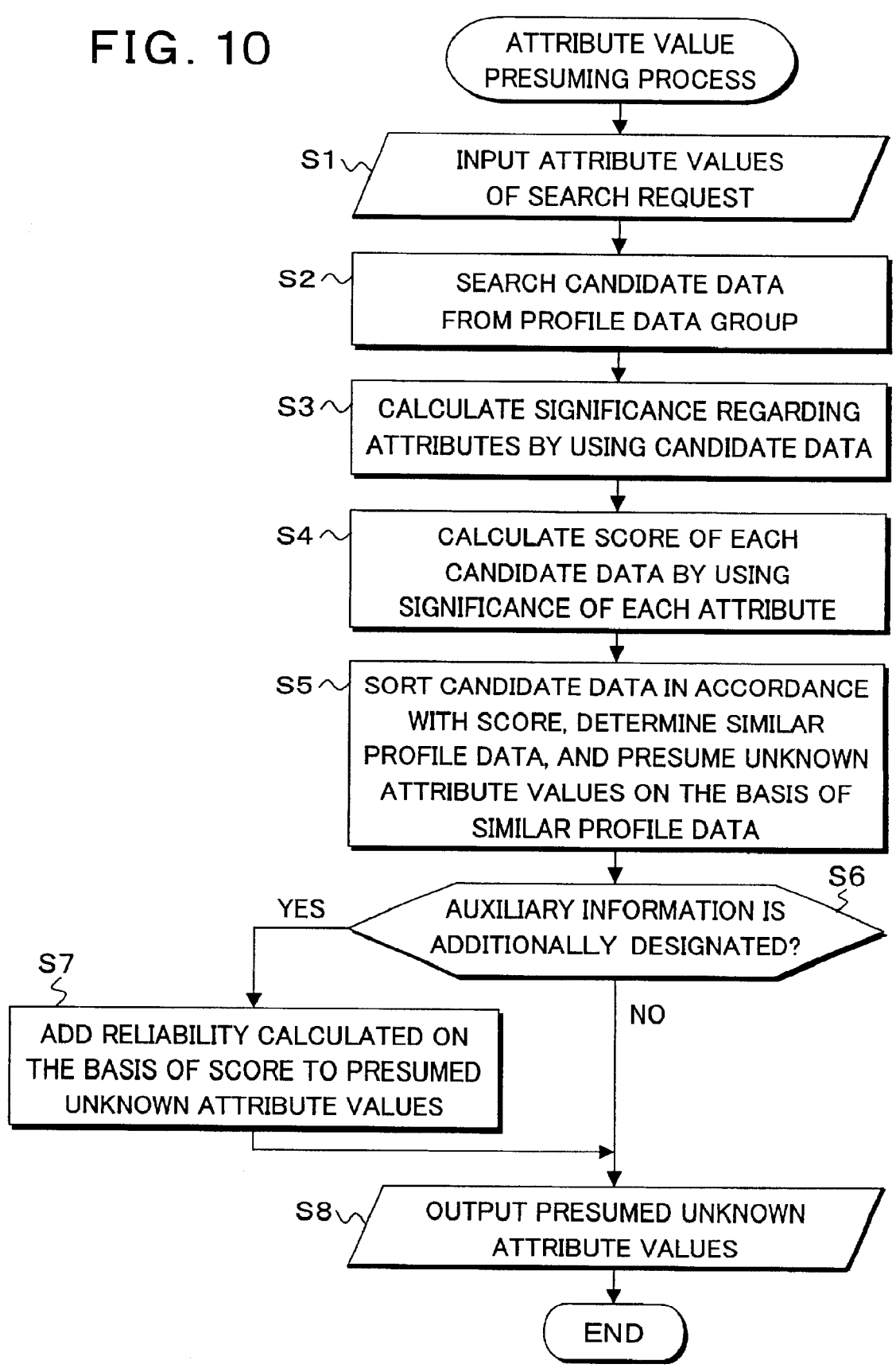
FIG. 10 is a flowchart for an attribute presuming process of the invention according to the functional construction of FIG. 9.

FIG. 10 is a flowchart for the attribute value presuming process in the embodiment of FIG. 9 and shows a processing procedure of a program for executing the attribute value presuming process. Steps S1 to S4 in the attribute value presuming process are the same as steps S1 to S4 in FIG. 4A. Subsequently, in step S5, the candidate data having the scores which are equal to or larger than the designated number of upper candidate data or the designated threshold value is determined as similar profile data to the input data in accordance with the score calculated in step S4, and an uninput attribute value in the input data to which the search has been requested is presumed on the basis of the distribution of the uninput attribute values in the similar profile data.

FIGS. 11A to 11C are diagrams showing specific examples of the presuming process of the uninput attribute value in step S5. In the field of electronic commerce, an issue such that whether a certain user buys a certain article or not is presumed will now be considered. In this case, it is assumed that profile data of the certain user has been inputted as input data 72 as shown in FIG. 11A. In the profile data as input data 72, "occupation", "interested music genre", and "interested book genre" are inputted as known input attribute values, and an issue of whether the user buys a book of "ISBN-xxx" or not as an unknown input attribute value is considered. In accordance with the input data 72, distribution of persons who buy the book of "ISBN-xxx" and persons who do not buy this book among the data selected as similar profile data in the process in step S5 is calculated. If the number of persons who buy the book is larger than the number of persons who do not buy the book, it is presumed that the user inputted as input data buys the book of "ISBN-xxx". If it is smaller, it is presumed that the user does not buy the book. In the presumption of the uninput attribute value here, the improvement of precision of the presumption can be expected if the presumption is made in consideration of not only the distribution of the uninput attribute values in the similar profile data but also the score calculated in step S4. For example, it is now assumed that similar profile data distribution 74 which takes into consideration the scores of FIG. 11B is obtained in accordance with the input data 72 of FIG. 11A. In this case, in the distribution of the uninput attribute values "ISBN-xxx" in the similar profile data distribution 74, since the number of persons who do not buy the book is larger than the number of persons who buy the book, it is presumed in step S5 that the person does not buy the book. However, when referring to the scores, it will be understood that "buy" is distributed in the profile data having the high score, while "not buy" is distributed in the profile data having the low score. In this case, the improvement of precision of the presumption can be expected if weight distribution according to the scores of the uninput attribute values "ISBN-xxx" is used as an index of the presumption. That is, in the example of FIG. 11B, Buy=1.0+0.8=1.8

Not buy=0.5+0.4+0.3=1.2 are used as indices. Since the value in case of "buy" is larger than that of "not buy", it is possible to presume that the person buys the book. Subsequently, in step S6 in FIG. 10, whether the addition of the auxiliary information to the value presumed in step S5 has been designated or not is discriminated. If the addition of the auxiliary information has been designated in step S6, for example, as shown in FIG. 1C, reliability is added to the uninput attribute value which is presumed in step S7. As reliability, a value of the distribution of the values of "buy" and "not buy" or a value of weight distribution by the scores is used. For example, in case of using the value of the weight distribution as reliability,

60%=100×1.8/3.0 is added as reliability to the presumption value "buy".

40%=100×1.2/3.0 is added as reliability to the presumption value "not buy".

By the addition of the reliability, the user can easily discriminate the presumption result.

FIG. 12 shows an embodiment of a computer-readable recording medium in which the program for executing the information searching process according to the invention has been stored. That is, as a recording medium in which the program for the profile data searching process shown in the flowchart of FIG. 4 and the program for the attribute value presuming process shown in FIG. 10 have been stored, it is not limited to a portable recording medium 86 such as CD-ROM 82, flexible disk 80, or the like as shown in the example of FIG. 12, but it is possible to use either a recording medium of a storage device 88 existing on the network or a memory medium such as hard disk, RAM, or the like of a computer. When a program 90 is executed, it is loaded into a computer 92 and executed on a main memory.

As described above, according to the invention, on the basis of the profile attribute value which is inputted as input data responsive to the search request, the data is divided into the candidate data and the non-candidate data by executing the coarse search once, and the significance regarding the attribute is calculated by using the search result and weighted, thereby obtaining the score of each candidate data and outputting the upper candidate data as a search result by ranking the data on the basis of the scores. Thus, the profile data such as user, contents, services, etc. adapted to the profile attribute value which is inputted as input data can be searched and, further, the uninput attribute value can be presumed at high precision.

According to the invention, only when the profile attribute value for search is inputted as input data, the search for the candidate data is executed with respect to the held profile data group as a target, the significance regarding the attribute is calculated by using the searched candidate data and the non-candidate data, and the score is obtained. Therefore, merely by storing the profile data into the data storing unit as a search target, the search which copes promptly with the change in profile data and the presumption of the uninput attribute value can be realized.

Further, according to the invention, the attribute of the large significance calculated as a search result is automatically extracted as a viewpoint for search output, each attribute value in the extracted attribute is used as a viewpoint, and the search result can be sorted and presented every viewpoint, furthermore, auxiliary information which is useful for the search result or presumption result can be added. Thus, the user can easily make a discrimination about the search result or presumption result, and a burden which is applied when the user obtains the desired result can be remarkably reduced.

Although the information search and the attribute value presuming process in the invention have been executed on the server as an operation environment of the information searching process in the above embodiment, they can be also independently arranged on the server or client side or it is also possible to arrange a part of the functions to the server side and arrange the remaining functions to the client side.

Although the embodiments have been described in conjunction with the drawings, the invention is not limited by those embodiments themselves but incorporates many other modifications and variations without departing from the scope of the invention or the spirit thereof. Further, the invention is not limited by the numerical values shown in the embodiments.

What is claimed is:

1. An information searching method of profile information, comprising:
   candidate data searching wherein on the basis of input data in which attribute values have been designated, a plurality of similar candidate data is searched from a profile data group having a peculiar attribute value every different attribute;
   significance calculating wherein significance regarding the attribute is calculated on the basis of said searched candidate data and non-candidate data;
   score calculating wherein a score of each of said candidate data is calculated on the basis of said calculated significance; and
   search result outputting wherein each candidate data is ranked on the basis of said calculated score and said ranked upper candidate data is outputted as a search result.

2. A method according to claim 1, wherein
   in said candidate data searching the score is obtained with respect to each profile data and the candidate data is searched, and
   in said score calculating the score obtained by said candidate data searching is added to the score calculated on the basis of said significance, thereby calculating the score of each of said candidate data.

3. A method according to claim 1, wherein in said significance calculating the significance of every different attribute is calculated on the basis of said candidate data and said non-candidate data.

4. A method according to claim 3, wherein in said significance calculating an information gain is calculated as said significance of every different attribute.

5. A method according to claim 4, wherein in said score calculating similarity is calculated as said score of each of said candidate data by using said information gain as a weight.

6. A method according to claim 1, wherein in said significance calculating the significance of the different attribute values included in the same attribute is calculated.

7. A method according to claim 6, wherein in said significance calculating an MVDM (Modified Value Difference Metric) is calculated as said significance of the different attribute values.

8. A method according to claim 7, wherein in said score calculating similarity is calculated as said score of each of said candidate data by using said MVDM (Modified Value Difference Metric) as a weight.

9. A method according to claim 1, wherein
   in said score calculating the score of said non-candidate data is further calculated on the basis of said calculated significance, and
   in said search result outputting each of said candidate data and said non-candidate data is ranked on the basis of said calculated score and said ranked upper candidate data is outputted as a search result.

10. A method according to claim 1, wherein in said search result outputting a predetermined number of said ranked upper candidate data or the candidate data having the scores which are equal to or larger than a predetermined threshold value is outputted as said search result.

11. A method according to claim 1, wherein in said search result outputting said calculated significance is added to the attribute value of profile data which is outputted as said search result and the resultant attribute value is outputted.

12. A method according to claim 1, wherein in said search result outputting if an output per viewpoint has been set, the attribute having the large significance among said calculated significance is selected as a viewpoint, each of said candidate data is sorted every different attribute value included in said selected attribute of the viewpoint, each of said candidate data sorted every attribute value is ranked on the basis of said calculated score, and said ranked upper candidate data is outputted as a search result per viewpoint.

13. An information searching method of profile information, comprising:
   candidate data searching wherein on the basis of input data in which attribute values including an uninput attribute value have been designated, a plurality of similar candidate data is searched from a profile data group including the attribute values having a peculiar value every different attribute;
   significance calculating wherein significance regarding the attribute is calculated on the basis of said searched candidate data and non-candidate data;
   score calculating wherein a score of each of said candidate data is calculated on the basis of said calculated significance; and
   presumption result outputting wherein similar data to said input attribute value is determined from said candidate data in accordance with the score of each of said candidate data, and the uninput attribute value of said input data is presumed on the basis of distribution of the uninput attribute values in said similar data and outputted.

14. A method according to claim 13, wherein
   in said candidate data searching the score is obtained with respect to each profile data and the candidate data is searched, and
   in said score calculating the score obtained by said candidate data searching is added to the score calculated on the basis of said significance, thereby calculating the score of each of said candidate data.

15. A method according to claim 13, wherein in said significance calculating the significance of every different attribute is calculated on the basis of said candidate data and said non-candidate data.

16. A method according to claim 15, wherein in said significance calculating an information gain is calculated as said significance of every different attribute.

17. A method according to claim 16, wherein in said score calculating similarity is calculated as said score of each of said candidate data by using said information gain as a weight.

18. A method according to claim 13, wherein in said significance calculating the significance of the different attribute values included in the same attribute is calculated.

19. A method according to claim 18, wherein in said significance calculating an MVDM (Modified Value Difference Metric) is calculated as said significance of the different attribute values.

20. A method according to claim 19, wherein in said score calculating similarity is calculated as said score of each of said candidate data by using said MVDM (Modified Value Difference Metric) as a weight.

21. A method according to claim 13, wherein in said presumption result outputting reliability calculated on the basis of the score of each of said candidate data is added to said presumed uninput attribute value and the resultant attribute value is outputted.

22. A method according to claim 21, wherein in said presumption result outputting said reliability is equal to a value obtained by dividing the score which enables the presumption value of each of said candidate data by a sum of the scores.

23. A program for searching profile information, wherein said program allows a computer to execute:
candidate data searching wherein on the basis of input data in which attribute values have been designated, a plurality of similar candidate data is searched from a profile data group having a peculiar attribute value every different attribute;
significance calculating wherein significance regarding the attribute is calculated on the basis of said searched candidate data and non-candidate data;
score calculating wherein a score of each of said candidate data is calculated on the basis of said calculated significance; and
search result outputting wherein each candidate data is ranked on the basis of said calculated score and said ranked upper candidate data is outputted as a search result.

24. A program according to claim 23, wherein
in said candidate data searching the score is obtained with respect to each profile data and the candidate data is searched, and
in said score calculating the score obtained by said candidate data searching is added to the score calculated on the basis of said significance, thereby calculating the score of each of said candidate data.

25. A program according to claim 23, wherein in said significance calculating the significance of every different attribute is calculated on the basis of said candidate data and said non-candidate data.

26. A program according to claim 25, wherein in said significance calculating an information gain is calculated as said significance of every different attribute.

27. A program according to claim 26, wherein in said score calculating similarity is calculated as said score of each of said candidate data by using said information gain as a weight.

28. A program according to claim 23, wherein in said significance calculating the significance of the different attribute values included in the same attribute is calculated.

29. A program according to claim 28, wherein in said significance calculating an MVDM (Modified Value Difference Metric) is calculated as said significance of the different attribute values.

30. A program according to claim 29, wherein in said score calculating similarity is calculated as said score of each of said candidate data by using said MVDM (Modified Value Difference Metric) as a weight.

31. A program according to claim 23, wherein
in said score calculating the score of said non-candidate data is further calculated on the basis of said calculated significance, and
in said search result outputting each of said candidate data and said non-candidate data is ranked on the basis of said calculated score and said ranked upper candidate data is outputted as a search result.

32. A program according to claim 23, wherein in said search result outputting a predetermined number of said ranked upper candidate data or the candidate data having the scores which are equal to or larger than a predetermined threshold value is outputted as said search result.

33. A program according to claim 23, wherein in said search result outputting said calculated significance is added to the attribute value of profile data which is outputted as said search result and the resultant attribute value is outputted.

34. A program according to claim 23, wherein in said search result outputting if an output per viewpoint has been designated, the attribute having the large significance among said calculated significance is selected as a viewpoint, each of said candidate data is sorted every different attribute value included in said selected attribute of the viewpoint, each of said candidate data sorted every attribute value is ranked on the basis of said calculated score, and said ranked upper candidate data is outputted as a search result per viewpoint.

35. A program for searching profile information, wherein said program allows a computer to execute:
candidate data searching wherein on the basis of input data in which attribute values including an uninput attribute value have been designated, a plurality of similar candidate data is searched from a profile data group including the attribute values having a peculiar value every different attribute;
significance calculating wherein significance regarding the attribute is calculated on the basis of said searched candidate data and non-candidate data;
score calculating wherein a score of each of said candidate data is calculated on the basis of said calculated significance; and
presumption result outputting wherein similar data to said input attribute value is determined from said candidate data in accordance with the score of each of said candidate data, and the uninput attribute value of said input data is presumed on the basis of distribution of the uninput attribute values in said similar data and outputted.

36. A program according to claim 35, wherein
in said candidate data searching the score is obtained with respect to each profile data and the candidate data is searched, and
in said score calculating the score obtained by said candidate data searching is added to the score calculated on the basis of said significance, thereby calculating the score of each of said candidate data.

37. A program according to claim 35, wherein in said significance calculating the significance of every different attribute is calculated on the basis of said candidate data and said non-candidate data.

38. A program according to claim 37, wherein in said significance calculating an information gain is calculated as said significance of every different attribute.

39. A program according to claim 38, wherein in said score calculating similarity is calculated as said score of each of said candidate data by using said information gain as a weight.

40. A program according to claim 35, wherein in said significance calculating the significance of the different attribute values included in the same attribute is calculated.

41. A program according to claim 40, wherein in said significance calculating an MVDM (Modified Value Difference Metric) is calculated as said significance of the different attribute values.

42. A program according to claim 41, wherein in said score calculating similarity is calculated as said score of each of said candidate data by using said MVDM (Modified Value Difference Metric) as a weight.

43. A program according to claim 35, wherein in said presumption result outputting reliability calculated on the basis of the score of each of said candidate data is added to said presumed uninput attribute value and the resultant attribute value is outputted.

44. A program according to claim 43, wherein in said presumption result outputting said reliability is equal to a value obtained by dividing the score which enables the presumption value of each of said candidate data by a sum of the scores.

45. A computer-readable recording medium which stores a program for allowing a computer to execute:

candidate data searching wherein on the basis of input data in which attribute values have been designated, a plurality of similar candidate data is searched from a profile data group having a peculiar attribute value every different attribute;

significance calculating wherein significance regarding the attribute is calculated on the basis of said searched candidate data and non-candidate data;

score calculating wherein a score of each of said candidate data is calculated on the basis of said calculated significance; and search result outputting wherein each candidate data is ranked on the basis of said calculated score and said ranked upper candidate data is outputted as a search result.

46. A computer-readable recording medium which stores a program for allowing a computer to execute:

candidate data searching wherein on the basis of input data in which attribute values including an uninput attribute value have been designated, a plurality of similar candidate data is searched from a profile data group including the attribute values having a peculiar attribute value every different attribute;

significance calculating wherein significance regarding the attribute is calculated on the basis of said searched candidate data and non-candidate data;

score calculating wherein a score of each of said candidate data is calculated on the basis of said calculated significance; and presumption result outputting wherein similar data to said input attribute value is determined from said candidate data in accordance with the score of each of said candidate data, and the uninput attribute value of said input data is presumed on the basis of distribution of the uninput attribute values in said similar data and outputted.

47. An information searching apparatus comprising:

a data storing unit in which a plurality of profile data each having a peculiar attribute value every different attribute has been stored;

a candidate data searching unit which searches a plurality of similar candidate data from the profile data group stored in said data storing unit on the basis of input data in which attribute values have been designated;

a significance calculating unit which calculates significance regarding the attribute on the basis of said searched candidate data and non-candidate data;

a score calculating unit which calculates a score of each of said candidate data on the basis of said calculated significance; and a search result output unit which ranks each of said candidate data on the basis of said calculated score and outputs said ranked upper candidate data as a search result.

48. An information searching apparatus comprising:

a data storing unit in which a plurality of profile data each including attribute values having a peculiar attribute value every different attribute has been stored;

a candidate data searching unit which searches a plurality of similar candidate data from the profile data group stored in said data storing unit on the basis of input data in which attribute values including an uninput attribute value have been designated;

a significance calculating unit which calculates significance regarding the attribute on the basis of said searched candidate data and non-candidate data;

a score calculating unit which calculates a score of each of said candidate data on the basis of said calculated significance; and a presumption result output unit which determines similar data to said input attribute value from said candidate data in accordance with the score of each of said candidate data, presumes the uninput attribute value of said input data on the basis of distribution of the uninput attribute values in said similar data, and outputs the presumed uninput attribute value.

* * * * *